US010435856B2

United States Patent
Winters et al.

(10) Patent No.: US 10,435,856 B2
(45) Date of Patent: Oct. 8, 2019

(54) COMPRESSIBLE LIQUID CONTAINMENT BERM ASSEMBLY

(71) Applicants: Cary Winters, Everett, WA (US); Tim McGrath, Greer, SC (US)

(72) Inventors: Cary Winters, Everett, WA (US); Tim McGrath, Greer, SC (US)

(73) Assignee: ULTRATECH INTERNATIONAL, INC., Jacksonville, FL (US)

( * ) Notice: Subject to any disclaimer, the term of this patent is extended or adjusted under 35 U.S.C. 154(b) by 0 days.

(21) Appl. No.: 15/946,988

(22) Filed: Apr. 6, 2018

(65) Prior Publication Data

US 2018/0230661 A1    Aug. 16, 2018

Related U.S. Application Data

(63) Continuation-in-part of application No. 15/046,307, filed on Feb. 17, 2016, now Pat. No. 9,944,046.

(60) Provisional application No. 62/117,166, filed on Feb. 17, 2015.

(51) Int. Cl.
| | |
|---|---|
| *E02B 3/10* | (2006.01) |
| *E02B 7/00* | (2006.01) |
| *B32B 5/02* | (2006.01) |
| *B08B 17/02* | (2006.01) |

(52) U.S. Cl.
CPC ............ *E02B 3/108* (2013.01); *B08B 17/025* (2013.01); *B32B 5/024* (2013.01); *E02B 3/106* (2013.01); *E02B 7/005* (2013.01)

(58) Field of Classification Search
CPC ........ B65D 90/24; B65D 25/38; B65D 90/12; B65D 90/22; B65D 90/26; B32B 5/18
USPC ....................................................... 220/62.22
See application file for complete search history.

(56) References Cited

U.S. PATENT DOCUMENTS

| | | | | |
|---|---|---|---|---|
| 4,031,676 | A | * | 6/1977 | Dally .................... D06F 39/081 |
| | | | | 52/102 |
| 5,236,281 | A | | 8/1993 | Middleton |
| 5,454,195 | A | * | 10/1995 | Hallsten ................. B65D 90/24 |
| | | | | 220/495.01 |
| 5,605,416 | A | | 2/1997 | Roach |
| 5,689,920 | A | | 11/1997 | Hallsten |
| 5,820,297 | A | | 10/1998 | Middleton |
| 6,151,855 | A | | 11/2000 | Campbell |
| 6,695,534 | B2 | * | 2/2004 | Cain ..................... B65D 90/24 |
| | | | | 405/114 |

(Continued)

*Primary Examiner* — Shawn M Braden
(74) *Attorney, Agent, or Firm* — Thomas C. Saitta (57) ABSTRACT

A compressible liquid retaining berm having a plurality of linear wall members and right angle corner members composed of a compressible, resilient material such that the wall members and corner members will rebound to a neutral state after being compressed. A longitudinal slot is disposed in the top wall of the wall members and the corner members, with the corner member longitudinal slots communicating with a recess positioned in the corner member. A liquid impermeable liner member is disposed on the interior side of the wall members and corner members, the liner member extending across the wall members and corner members. The liner member is secured to the wall members and corner members by positioning elongated anchor members atop the liner member in alignment with the longitudinal slots, such that the weight of the anchor members results in the anchor members being received within the longitudinal slots.

13 Claims, 6 Drawing Sheets

(56) References Cited

U.S. PATENT DOCUMENTS

| | | |
|---|---|---|
| 7,922,423 B2 | 4/2011 | Perkins |
| 8,702,345 B2 | 4/2014 | Stein |
| 9,016,980 B2 | 4/2015 | Wheeler et al. |
| 9,625,093 B2 | 4/2017 | Matson |
| 2007/0207306 A1* | 9/2007 | Broughton ................ B32B 5/18 428/304.4 |
| 2012/0076588 A1* | 3/2012 | Dupuis ................ F01M 11/03 405/107 |
| 2016/0312426 A1* | 10/2016 | Happy ................ B65D 90/24 |

* cited by examiner

COMPRESSIBLE LIQUID CONTAINMENT BERM ASSEMBLY

This application is a continuation-in-part of U.S. patent application Ser. No. 15/046,307, filed Feb. 17, 2016, and claims the benefit of U.S. Patent Application Ser. No. 62/117,166, filed Feb. 17, 2105.

BACKGROUND OF THE INVENTION

This invention relates generally to the field of berms, walls, dykes, pools and the like used to retain liquid or to prevent unwanted movement of liquid, particularly in situations where the liquid is a hazardous liquid accidentally released, leaked or spilled. More particularly, it relates to such devices wherein the berms are constructed such that a vehicle may be driven over the berm, and even more particularly, wherein the berm is compressible.

In many situations it is desirable to have a secondary means for retaining, containing, diverting or directing liquid in conjunction with a liquid container means, such as a drum, tank, pipeline, piece of machinery, electrical transformer, tanker truck or the like, especially when the liquid is a hazardous liquid that may pollute or harm the environment. It is also desirable to have primary means for retaining, containing, diverting or directing liquid that needs to be controlled for protection of the environment, re-use or other purposes, such as for example retention of wash water when motor vehicles are cleaned, or capture of spilled liquid during tanker truck loading operations. Many pre-manufactured containment devices, such as permanent walls, flexible pools, polymer berms, are known and used for these purposes.

It is an object of this invention to provide a containment berm that is easily and rapidly deployed and assembled on site and which may be composed of modular components making transport and storage easier. It is a further object to provide a containment berm that has compressible perimeter components, such that vehicles may be driven into and out of the containment berm as required without damaging the retention properties of the berm. It is a further object to provide a containment berm that may be assembled and disassembled in a relatively uncomplicated manner.

SUMMARY OF THE INVENTION

As shown in various embodiments, such embodiments meant to be non-limiting with regard to the scope of the invention, the compressible liquid retaining berm comprises in general a plurality of wall members, the wall members composed of a compressible, resilient material such that the wall members will rebound to a neutral state after being compressed, such as by having a vehicle drive over them. Preferably, the wall members are comprised of a foam body with an elastomeric outer coating and have a generally trapezoidal shape, the top wall being narrower than the base, although other configurations are possible. Preferably a fabric, mesh or scrim member is positioned on the foam body prior to application of the elastomeric outer coating. Vent openings may be provided in the elastomeric coating to provide for egress and ingress of air when the foam body is compressed and then released to expand. A longitudinal slot is disposed in the top wall and extends the length of the wall member, and a transverse slot is disposed in the top wall adjacent each end of the wall member, preferably perpendicular to the longitudinal slot. A liquid impermeable liner member is disposed on the interior side of the wall members to form a floor or bottom, the liner member extending across the wall members. The liner member is secured to the wall members by positioning elongated anchor members atop the liner member in alignment with the longitudinal slots, such that the weight of the anchor members results in the anchor members forcing the liner member into the longitudinal slots. At right angle junctions of abutting wall members, the anchor member extends beyond the end of the longitudinal slot of one wall member and across the transverse slot of the adjoining wall member.

In an alternative embodiment, the compressible liquid retaining berm comprises a plurality of wall members and a plurality of corner members, the corner members composed of a compressible, resilient material such that the corner members will rebound to a neutral state after being compressed. Whereas the wall members are linear, the corner members are each configured as a right angle body. The corner member is provided with two longitudinal slots disposed at right angles and communicating with a recess, the recess having a floor positioned equal or below the depth of the longitudinal slots, such that with the liner member placed over the corner member, anchor members may be inserted to reside in the longitudinal slots and recess.

In alternative language, the invention is a compressible liquid containment berm assembly comprising a plurality of compressible, resilient wall members each comprising a polymer foam body with a longitudinal slot, said wall members arranged to form a perimeter; a liquid impermeable liner member extending between and onto said wall members; and elongated anchor members positioned on top of said liner member and within said longitudinal slots, whereby said liner member is secured within said longitudinal slots by said anchor members. The invention may further comprise the assembly with each of said wall members further comprising an elastomeric liquid impermeable coating layer adhered to said foam body; each of said wall members further comprising a reinforcing layer positioned between said foam body and said elastomeric outer coating layer; wherein said anchor members are chosen from the group of anchor members consisting of metal rods, metal pipes, polymer pipes, cables and wires; wherein said reinforcing layer is chosen from the group of reinforcing layers consisting of fabric, mesh or scrim; each of said wall members further comprising transverse slots adapted to receive said anchor members; further comprising venting members positioned in said elastomeric coating layer; wherein each said wall member comprises a base, side walls and top wall, wherein said base is wider than said top wall, and wherein said longitudinal slot is disposed in said top wall; wherein one said anchor member disposed in said longitudinal slot of one said wall member and in said transverse slot of an adjoining said wall member.

In further alternative language, the invention is a compressible liquid containment berm assembly comprising: a plurality of compressible, resilient wall members each comprising a polymer foam body with a longitudinal slot; a plurality of compressible, resilient corner members each comprising a polymer foam body, two arm members disposed at a right angle, and a recess, each said arm member having a longitudinal slot communicating with said recess; said wall members and said corner members arranged to form a perimeter such that each said corner member longitudinal slot is aligned with one of said wall member longitudinal slots; a liquid impermeable liner member extending between and onto said wall members and said corner members; and anchor members positioned on top of said liner member and within said wall member longitudinal slots, said corner member longitudinal slots and said recesses, whereby said liner member is secured within said wall member longitudinal slots, said corner member longitudinal slots and said recesses by said anchor members. Furthermore, the invention with each of said wall members and said corner members further comprising an elastomeric liquid impermeable coating layer adhered to said foam body; each of said wall members and said corner members further comprising a reinforcing layer positioned between said foam body and said elastomeric outer coating layer; wherein said anchor members are chosen from the group of anchor members consisting of metal rods, metal pipes, polymer pipes, cables and wires; wherein said reinforcing layer is chosen from the group of reinforcing layers consisting of fabric, mesh or scrim; wherein each said wall member and each said corner member comprises a base, side walls and top wall, wherein said base is wider than said top wall, and wherein said longitudinal slot is disposed in said top wall; each of said wall members further comprising transverse slots adapted to receive said anchor members; wherein said recess is defined by the combination of a floor and a truncated end of each said arm member; and/or wherein said floor is positioned at a depth equal to or below the depth of the corner member longitudinal slots.

DETAILED DESCRIPTION OF THE INVENTION

With reference now to the drawings, the drawings illustrating non-limiting embodiments of the invention, the invention will be described in detail. As shown in the various embodiments, the compressible liquid retaining berm 10 comprises in general a plurality of wall members 13, the wall members 13 being composed of a compressible, resilient material such that the wall members 13 will rebound to their original state after being compressed, such as by having a vehicle drive over them. The wall members 13 are comprised of the combination of a foam body 11 and an elastomeric outer coating layer 12. Polyurethane or polyethylene foams may be utilized as a suitable material of composition for the foam bodies 11, but other polymer foams of similar characteristics are also acceptable. While closed cell polymer foams may be utilized, open cell polymer foams are preferred due to superior rebound characteristics. It has also been found that over time closed cell foams, while having superior resistance to liquid intrusion than open cell foams, tend to degrade too rapidly when vehicles are repeatedly driven across the wall members 13 and lose their liquid impermeability.

The elastomeric outer coating layer 12 is a resilient, durable polymer material which increases the overall durability of the wall member 13, increases liquid impermeability and provides additional rebound characteristics to the wall member 13. An elastomeric coating material sold by Marvel Industrial Coatings under the designation M392 has been shown to be a suitable material of composition for the elastomeric outer coating 12. A coating of roughly 80 mil thickness has been found to be suitable. Coatings of greater or lesser thickness may be utilized. Preferably the coating 12 is sprayed on, but it is also possible to apply the coating 12 to the foam body 11 by brushing, rolling, dipping or any other suitable method. It is also possible to include reinforcing fibers in the elastomeric coating 12 to increase structural integrity and rebound characteristics. Various colors and textures may be chosen for the elastomeric outer coating 13.

Figure 1:
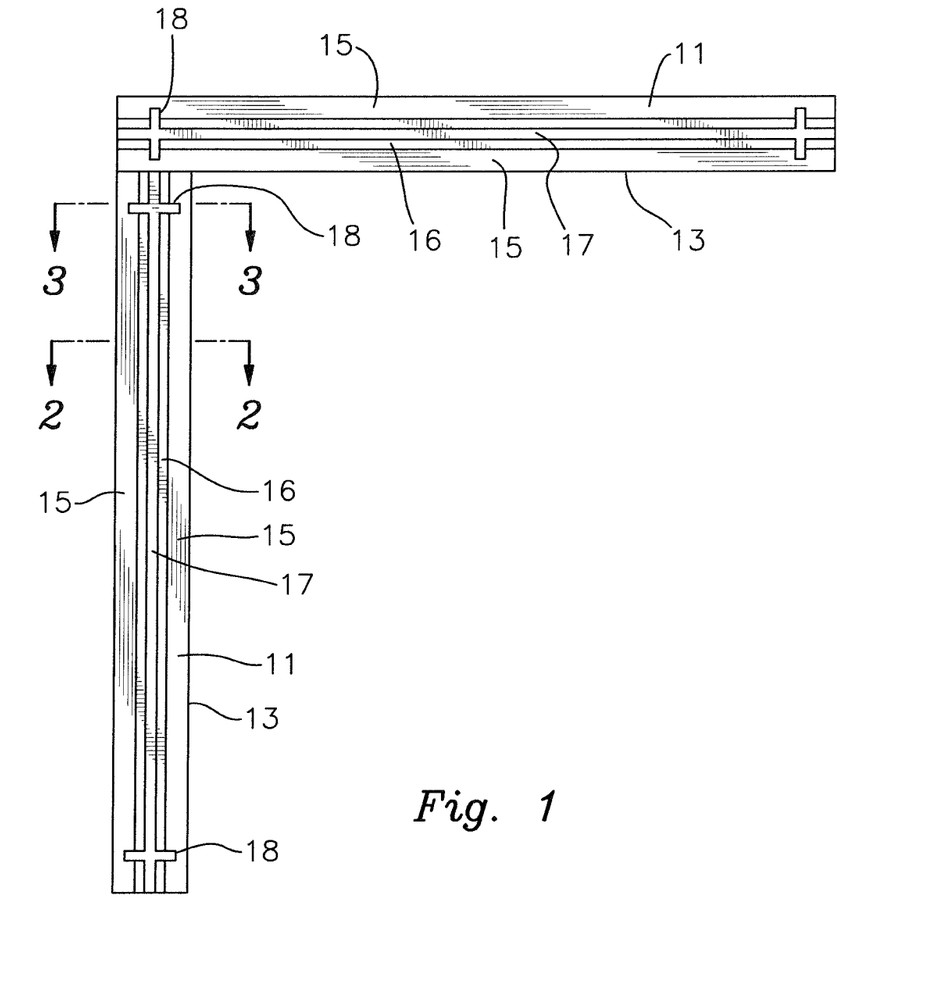
FIG. 1 is a top view showing two wall members abutted at a right angle.
Figure 2:
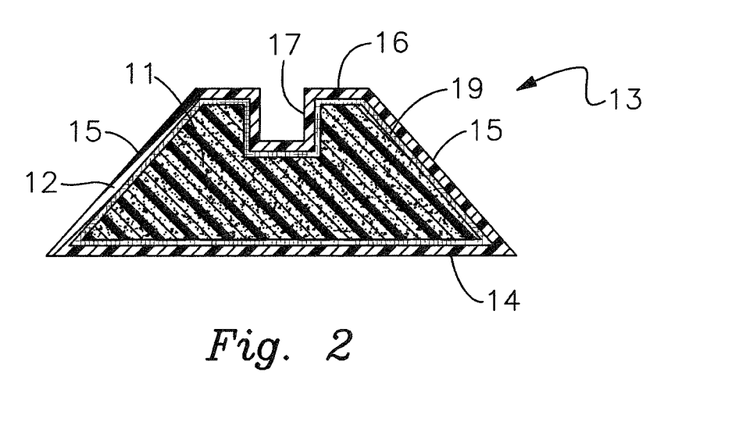
FIG. 2 is a cross-sectional view of a wall member taken along Line 2-2 of FIG. 1.
Figure 3:
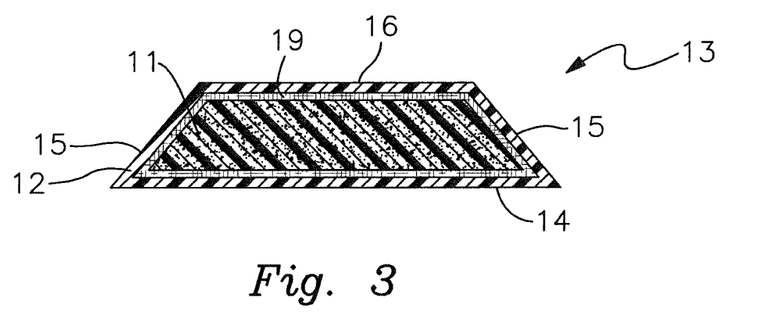
FIG. 3 is a cross-sectional view of a wall member taken along Line 3-3 of FIG. 1.

Most preferably a fabric, mesh or scrim material reinforcing layer 19 is positioned on the foam body 11 prior to application of the elastomeric outer coating 13, as shown in FIGS. 2 and 3. The reinforcing layer 19 comprises apertures that allow passage of the elastomeric outer coating 13 through the reinforcing layer 19 so that the coating 13 bonds to the surface of the foam body 11. The reinforcing layer 19 is composed of a material and structured such that it is flexible enough to withstand the stresses encountered from repeated compressions and expansions, and is primarily important to increase the lifespan of the elastomeric outing coating 13 by reducing cracking and tearing. The reinforcing layer 19 may be laid onto or wrapped around the foam bodies 11, and may be produced into the form of a tube or sleeve.

Figure 4:
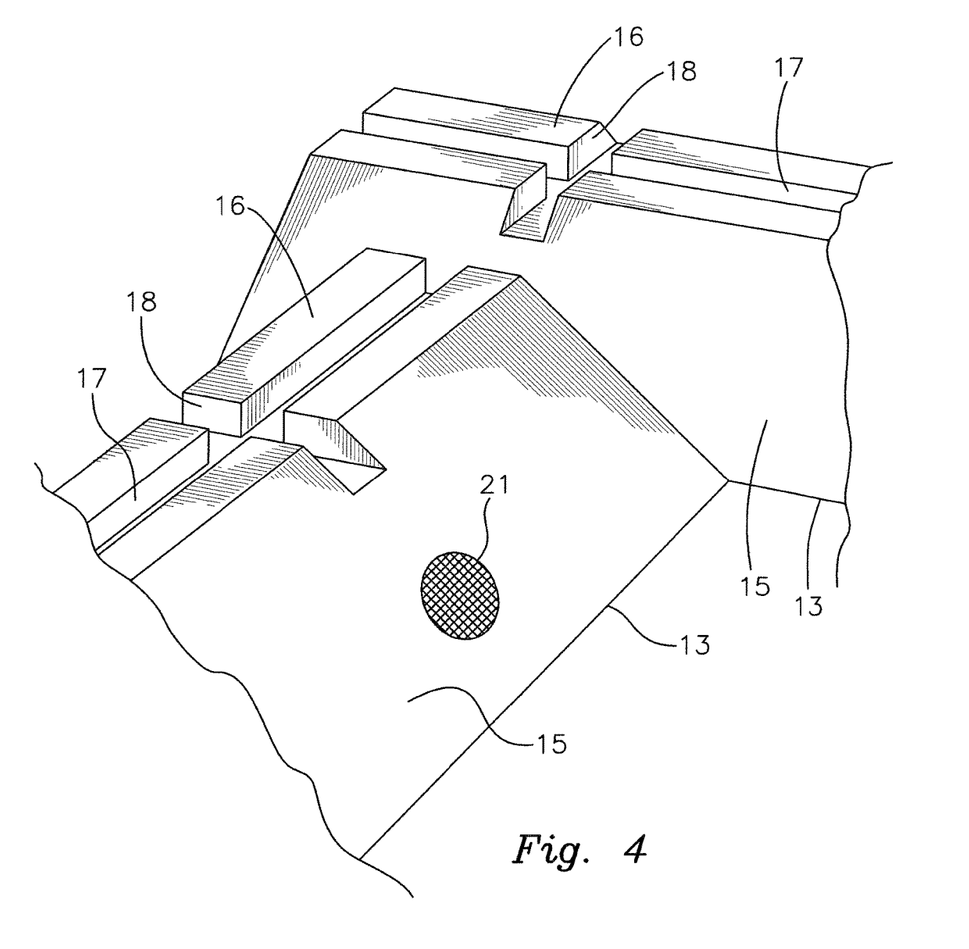
FIG. 4 is a partial perspective view of the abutting wall members of FIG. 1.

Because the wall members 13 are designed to allow for passage of heavy vehicles, in an alternative embodiment the elastomeric outer coating 13 is provided with venting members 21 to allow air to be expelled when the foam body 11 is compressed and drawn in when the foam body 11 expands backs after the vehicle weight is removed. While the venting members 21 may comprise simple openings, this is not desirable as water will be able to contact the foam body 11. Preferably, the venting members 21 comprise water impermeable valves, or alternatively, a liquid impermeable but breathable fabric or similar material covering the openings, as shown in FIG. 4.

The wall members 11 preferably have a generally trapezoidal shape comprising a base 14, sloped side walls 15 and top wall 16, the top wall 16 being narrower than the base 14. Other cross-sectional shapes may be suitable, such as for example an elliptical or curved configuration similar to roadway speed bumps. A longitudinal slot 17 is disposed in the top wall 16 and extends the length of the wall member 13. The width and depth of the slot 17 is determined by several factors, such as the thickness of the liner member 20 and/or the thickness of the anchor member 30, and preferably the edges are beveled or radiused. Generally, a deep slot 17 is desirable to minimize permanent bending of the anchor member 30 when vehicles are driven across the wall member 13.

Figure 9:
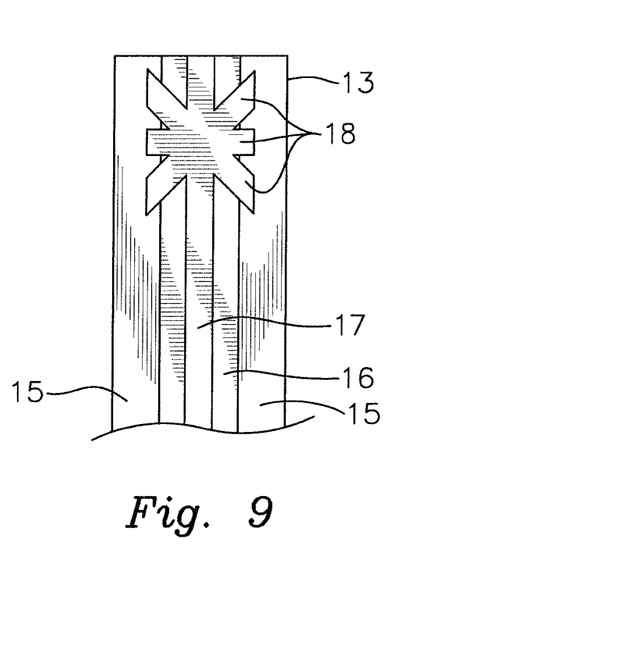
FIG. 9 is a partial top view showing a wall member with multiple transverse slots.

In one embodiment, a transverse slot 18 is disposed in the top wall 16 adjacent each end of the wall member 13, preferably perpendicular to the longitudinal slot 17. In an alternative embodiment, non-perpendicular transverse slots 18 may be provided, as shown in FIG. 9, such that the wall members 13 may be adjoined at non-perpendicular angles.

Figure 10:
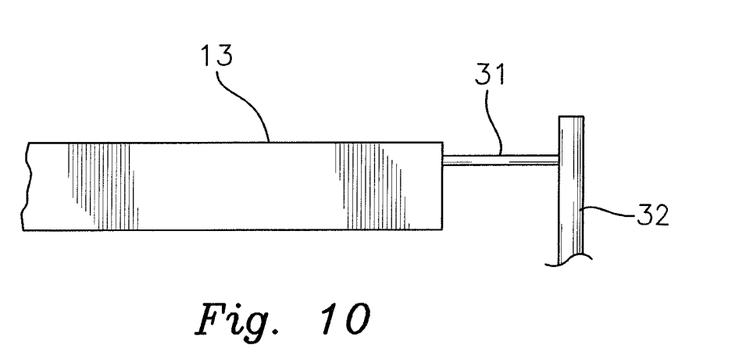
FIG. 10 is a partial side view showing the anchor member as comprising a cable.

With the wall members 13 arranged in a closed or substantially closed perimeter, or in a perimeter with an opening when it is desired to direct liquid instead of retain liquid, a liquid impermeable liner member 20 is disposed within the interior side of the wall members 13 to form a bottom or floor, with the liner member 20 extending across top wall 16 of the wall members 13, and most preferably beyond the wall members 13 onto the external ground surface. The liner member 20 is secured to the wall members 13 by positioning elongated anchor members 30 atop the liner member 20 in alignment with the longitudinal slots 17 of the wall members 13, such that the weight of the anchor members 30 results in the anchor members 30 pressing the liner member 20 down into the longitudinal slots 17, with at least a portion of the anchor members 30 being received within the longitudinal slots 17. Preferably the dimensions of the anchor members 30 and longitudinal slots 17 are chosen such that the anchor member 30 wedges the liner member 20 into the longitudinal slots 17. The anchors members 30 may comprise various embodiments, such as for example metal rods or pipes, polymer pipes filled with sand or other weighting material, double rods joined together or the like. In an alternative embodiment as shown in FIG. 10, the anchor members 30 may comprise a cable or wire 31 strung between two securing members 32, such as stakes or towers affixed to the ground surface at either end of the wall member 13. Turnbuckles or other tensioning mechanisms may be utilized to tighten the cable or wire 31 so as to draw the liner member 20 into the longitudinal slots 17.

Figure 5:
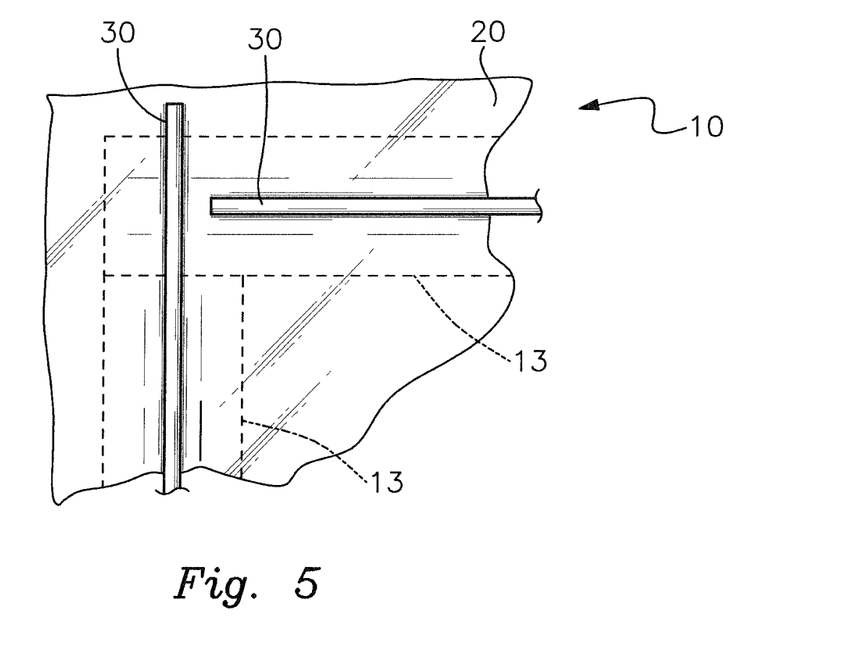
FIG. 5 is a partial view of an embodiment of a containment berm showing the liner member and anchor members assembled atop the wall members.

For linear sections of the containment berm 10, the anchor member 30 is positioned to extend across the junction between adjoining wall members 13. At right angle junctions of abutting wall members 13, an anchor member 30 extends beyond the end of the longitudinal slot 17 of one wall member 13 and across the transverse slot 18 of the adjoining wall member 13, as shown in FIG. 5.

Figure 6:
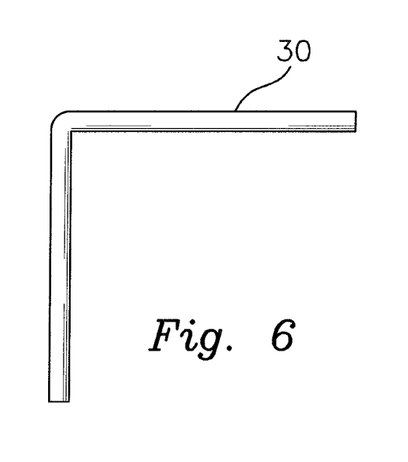
FIG. 6 is a top view of an alternative embodiment for an anchor member.

The liner member 20 may be provided with a non-skid or anti-slip surface, and may be manufactured as a disposable element when constructed of relatively less durable material. Liner members 20 may be chosen of various materials depending on the liquid to be encountered. As shown in FIG. 6, a right angle anchor member 30 may be provided for use at right angle junctions of adjoining wall members 13.

Figure 7:
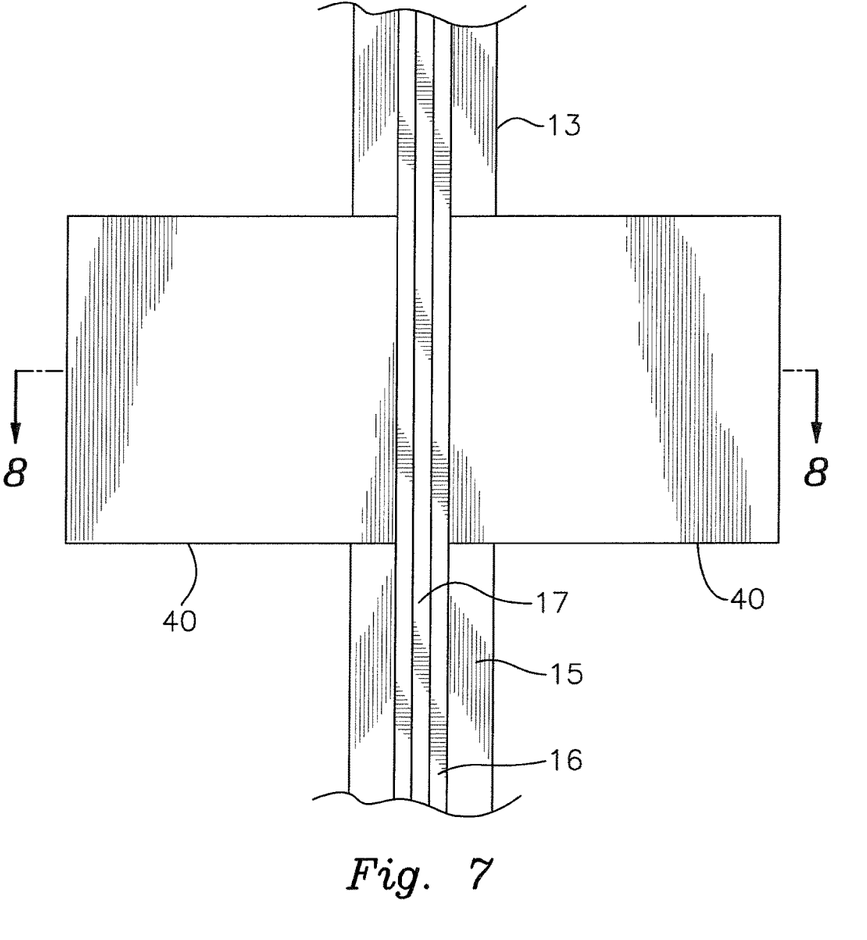
FIG. 7 is partial top view showing a wall member with supplemental ramp members.
Figure 8:
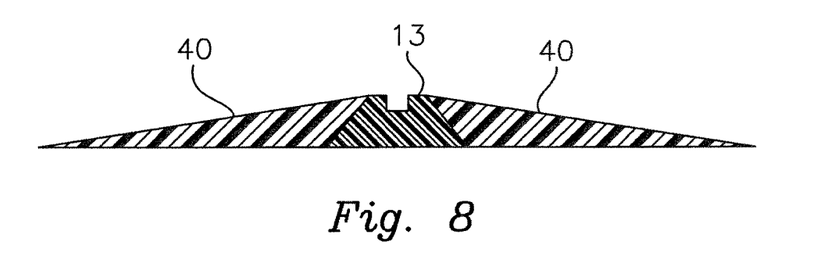
FIG. 8 is a cross-sectional view taken along Line 8-8 of FIG. 7.

The containment berm 10 as described is designed such that portions of the wall members 13 may be compressed under heavy load, such as by driving a motor vehicle across the wall member 13. After the load is removed, the resilient nature of the foam body 11 and the elastomeric coating 12 allows the wall member 13 to rebound to its neutral, non-compressed state. The modular nature of the containment berm 10 allows individual wall members 13 to be replaced in the event the wall member 13 is damaged or loses its rebounding ability and allows liner members 20 to be replaced if damaged without needing to replace the wall members 13. To better preserve the wall members 13, supplemental ramp members 40 may be provided on either side of the wall member 13, as shown in FIGS. 7 and 8. The ramp members 40 may be compressible or may be more rigid than the wall members 13.

Figure 11:
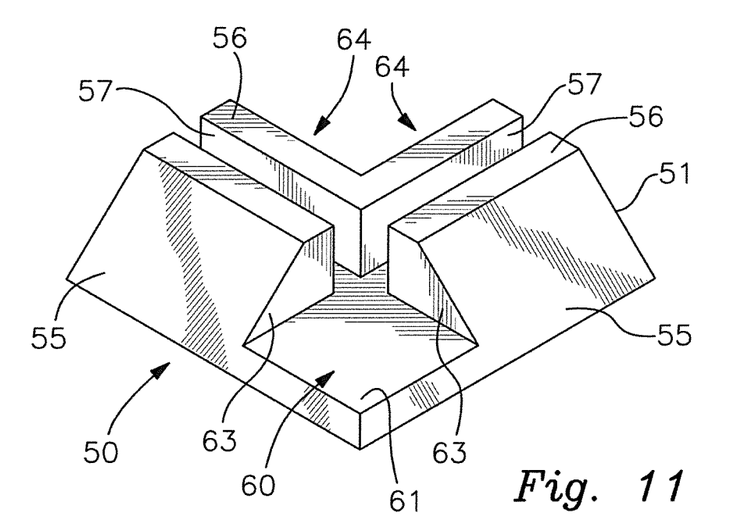
FIG. 11 is perspective view of a corner member.
Figure 12:
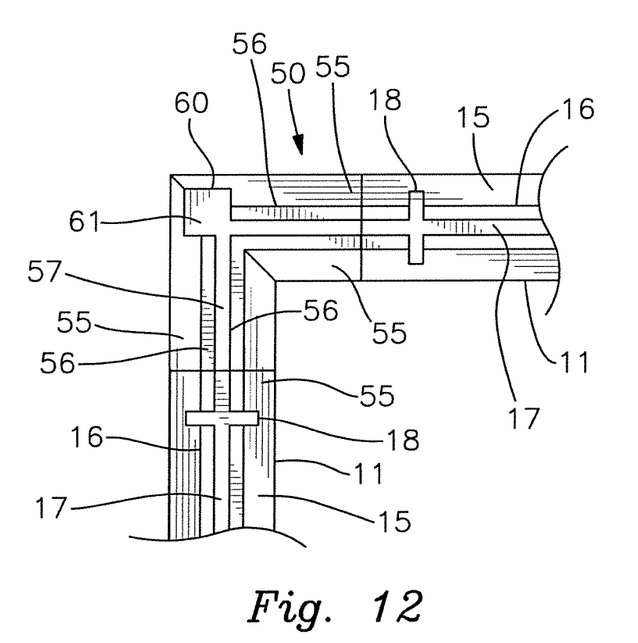
FIG. 12 is a top view showing the corner member of FIG. 11 abutting two perpendicular wall members.

In an alternative embodiment, as shown in FIGS. 11 and 12, the compressible liquid retaining berm comprises a plurality of wall members 13 and a plurality of corner members 50, the corner members 50 having a foam body 51 composed of a compressible, resilient material such that the corner members 50 will rebound to a neutral state after being compressed. Preferably the corner members 50 are composed of the same materials as the wall members 13. The corner members 50 are preferably configured to correspond in transverse cross-section with the configuration of the wall members 13, such that the corner members 50 likewise possess a generally trapezoidal shape defined by a top wall 56, sloping side walls 55, and a base. Whereas the wall members 13 are linear, the corner members 50 comprise two arm members 64 disposed at a right angle.

The corner members 50 are provided with two longitudinal slots 57 disposed at right angles, the longitudinal slots 57 communicating with a recess 60 defined by the combination of a floor 61 and the truncated ends 63 of the arm members 64. The floor 61 of the recess 60 is positioned at a depth from the top walls 56 equal to or below the depth of the longitudinal slots 57. The size of the recess 60 and the location of the truncated ends 63 of the arm members 64 are such that anchor members 30 positioned in one or both longitudinal slots 57, whether linear or formed at a right angle, may extend into the recess 60 after the liner member 20 is draped over the corner member 50.

With this configuration, two wall members 13 may be aligned and abutted against the corner member 50 such that the wall member longitudinal slots 17 align with corner member longitudinal slots 57, as shown in FIG. 12. The corner members 50 as described may also be utilized with wall members 13 not provided with transverse slots 18.

It is understood that equivalents or substitutions for certain elements set forth above may be obvious to those of skill in the art, and therefore the true scope and definition of the invention is to be as set forth in the following claims.

We claim:

1. A compressible liquid containment berm assembly comprising:
   a plurality of compressible, resilient wall members each comprising a polymer foam body with a longitudinal slot;
   a plurality of compressible, resilient corner members each comprising a polymer foam body, two arm members disposed at a right angle, and a recess, each said arm member having a longitudinal slot communicating with said recess;
   said wall members and said corner members arranged to form a perimeter such that each said corner member longitudinal slot is aligned with one of said wall member longitudinal slots;
   a liquid impermeable liner member extending between and onto said wall members and said corner members; and
   anchor members positioned on top of said liner member and within said wall member longitudinal slots, said corner member longitudinal slots and said recesses, whereby said liner member is secured within said wall member longitudinal slots, said corner member longitudinal slots and said recesses by said anchor members.

2. The assembly of claim 1, each of said wall members and said corner members further comprising an elastomeric liquid impermeable coating layer adhered to said foam body.

3. The assembly of claim 2, each of said wall members and said corner members further comprising a reinforcing layer positioned between said foam body and said elastomeric outer coating layer.

4. The assembly of claim 1, wherein said anchor members are chosen from the group of anchor members consisting of metal rods, metal pipes, polymer pipes, cables and wires.

5. The assembly of claim 2, wherein said anchor members are chosen from the group of anchor members consisting of metal rods, metal pipes, polymer pipes, cables and wires.

6. The assembly of claim 3, wherein said anchor members are chosen from the group of anchor members consisting of metal rods, metal pipes, polymer pipes, cables and wires.

7. The assembly of claim 3, wherein said reinforcing layer is chosen from the group of reinforcing layers consisting of fabric, mesh or scrim.

8. The assembly of claim 1, wherein each said wall member and each said corner member comprises a base, side walls and top wall, wherein said base is wider than said top wall, and wherein said longitudinal slot is disposed in said top wall.

9. The assembly of claim 2, wherein each said wall member and each said corner member comprises a base, side walls and top wall, wherein said base is wider than said top wall, and wherein said longitudinal slot is disposed in said top wall.

10. The assembly of claim 3, wherein each said wall member and each said corner member comprises a base, side walls and top wall, wherein said base is wider than said top wall, and wherein said longitudinal slot is disposed in said top wall.

11. The assembly of claim 1, each of said wall members further comprising transverse slots adapted to receive said anchor members.

12. The assembly of claim 1, wherein said recess is defined by the combination of a floor and a truncated end of each said arm member.

13. The assembly of claim 12, wherein said floor is positioned at a depth equal to or below the depth of the corner member longitudinal slots.

* * * * *